(12) United States Patent
Wang et al.

(10) Patent No.: US 11,860,893 B1
(45) Date of Patent: Jan. 2, 2024

(54) INPUT/OUTPUT PROXY METHOD AND APPARATUS FOR MIMIC REDIS DATABASE

(71) Applicant: ZHEJIANG LAB, Hangzhou (CN)

(72) Inventors: Peilei Wang, Hangzhou (CN); Ruyun Zhang, Hangzhou (CN); Tao Zou, Hangzhou (CN); Shunbin Li, Hangzhou (CN); Peilong Huang, Hangzhou (CN)

(73) Assignee: ZHEJIANG LAB, Hangzhou (CN)

( * ) Notice: Subject to any disclaimer, the term of this patent is extended or adjusted under 35 U.S.C. 154(b) by 0 days.

(21) Appl. No.: 17/981,368

(22) Filed: Nov. 4, 2022

Related U.S. Application Data

(63) Continuation of application No. PCT/CN2022/116169, filed on Aug. 31, 2022.

(30) Foreign Application Priority Data

Jun. 22, 2022 (CN) .......................... 202210708862.4

(51) Int. Cl.
G06F 16/20 (2019.01)
G06F 16/27 (2019.01)
G06F 16/25 (2019.01)
G06F 9/54 (2006.01)
H04L 67/56 (2022.01)

(52) U.S. Cl.
CPC ................ *G06F 16/27* (2019.01); *G06F 9/54* (2013.01); *G06F 16/256* (2019.01); *H04L 67/56* (2022.05)

(58) Field of Classification Search
None
See application file for complete search history.

(56) References Cited

U.S. PATENT DOCUMENTS

2021/0092069 A1* 3/2021 Musleh ............... H04L 47/2441

* cited by examiner

*Primary Examiner* — Belix M Ortiz Ditren
(74) *Attorney, Agent, or Firm* — IPro, PLLC

(57) ABSTRACT

Disclosed are an input/output proxy method and apparatus for a mimic Redis database. Through a pseudo server module, it is ensured that the interface of the Redis database is consistent with the external interface of the native Redis, so that it is convenient to implant the Redis database into arbitrary Redis application scenarios; the isolation of the modules inside is realized by independent processes, thus facilitating independent development, maintenance and expansion; and the synchronization function is integrated into the input/output proxy to achieve resource reuse; for the synchronization function, the random credit attenuation mechanism is cleverly utilized to ensure the synchronization function while taking into account the saving of resources.

7 Claims, 4 Drawing Sheets

Enabling the pseudo server module, the arbiter interaction module and the database interaction modules to run as independent processes, and establishing data transmission channels for inter-process communication between the pseudo server module and the arbiter interaction module and the database interaction modules

↓

Receiving, by the pseudo server module, a connection establishment request initiated by a user, creating a socket bound to the user and establishing a connection while maintaining the state information of the user connection

↓

Receiving, by the pseudo server module, a command request initiated by the user, updating the state information of the user connection, obtaining the type of the command request according to a definition mode of the type of the command request, and starting a response mode corresponding to the type of the command request; performing, by a pseudo server, a corresponding operation according to the response mode

↓

Performing, by the pseudo server module, dynamic data synchronization

Enabling the pseudo server module, the arbiter interaction module and the database interaction modules to run as independent processes, and establishing data transmission channels for inter-process communication between the pseudo server module and the arbiter interaction module and the database interaction modules

Receiving, by the pseudo server module, a connection establishment request initiated by a user, creating a socket bound to the user and establishing a connection while maintaining the state information of the user connection

Receiving, by the pseudo server module, a command request initiated by the user, updating the state information of the user connection, obtaining the type of the command request according to a definition mode of the type of the command request, and starting a response mode corresponding to the type of the command request; performing, by a pseudo server, a corresponding operation according to the response mode

Performing, by the pseudo server module, dynamic data synchronization

INPUT/OUTPUT PROXY METHOD AND APPARATUS FOR MIMIC REDIS DATABASE

CROSS REFERENCE TO RELATED APPLICATIONS

The present disclosure claims priority to Chinese Patent Application No. 202210708862.4 filed to the CNIPA on Jun. 22, 2022 and entitled "INPUT/OUTPUT PROXY METHOD AND APPARATUS FOR MIMIC REDIS DATABASE", the entire contents of which are incorporated herein by reference.

TECHNICAL FIELD

The present disclosure relates to the technical field of endogenous security databases, particularly an input/output proxy method and apparatus for a mimic Redis database.

BACKGROUND

The current remote dictionary server (Redis) database technology is widely used in numerous fields, e.g., the network operating system SONiC is built based on the Redis database. However, the current application of the Redis database is often based on existing open-source projects, so the security of the database is difficult to guarantee, and the ability to resist unknown risks is also lacking.

SUMMARY

The purpose of the present disclosure is to provide an input/output proxy method and apparatus for a mimic Redis database to overcome the deficiencies in the prior art.

To achieve the above purpose, the present disclosure provides the following technical solution:

Preferably, disclosed is an input/output proxy method for a mimic Redis database, including a mimic Redis database, a mimic input/output proxy container and an arbiter. The mimic Redis database includes at least three database containers running Redis server processes; the mimic input/output proxy container consists of a pseudo server module, an arbiter interaction module, and no less than three database interaction modules. The arbiter interaction module is connected with the arbiter; and the database interaction module is connected with the database container; the method specifically includes the following steps:

S1, initialization phase: enabling the pseudo server module, the arbiter interaction module and the database interaction modules to run as independent processes; and establishing data transmission channels for inter-process communication between the pseudo server module and the arbiter interaction module and the database interaction modules;

S2, receiving, by the pseudo server module, a connection establishment request initiated by a user, creating a socket bound to the user and establishing a connection while maintaining the state information of the user connection;

S3, receiving, by the pseudo server module, a command request initiated by the user, updating the state information of the user connection, obtaining the type of the command request according to a definition mode of the kind of the command request, and starting a response mode corresponding to the type of the command request; performing, by a pseudo server module, a corresponding operation according to the response mode; and S4, performing, by the pseudo server module, dynamic data synchronization.

Preferably, the number of database containers is the same as that of database interaction modules.

Preferably, the state information in S2 includes socket descriptor, user name, user authentication information, user input buffer and user output buffer.

Preferably, the definition mode of the type of the command request in S3 includes pre-compilation definition and runtime definition; the pre-compilation definition specifically includes manually setting command types of various Redis interaction commands in the code development stage; the runtime definition includes adding a command option when a user sends a command request, and the pseudo server module determines the type of the command request according to the command option.

Preferably, the response mode in S3 includes a normal mode and a mimic mode;

S31, in the normal mode, the pseudo server selects one of the database interaction modules based on the credit score mechanism, and enables the user to be indirectly connected with a database container running a Redis server process through the database interaction module;

S32, in the mimic mode, the pseudo server distributes the command request initiated by the user to no less than three database interaction modules at the same time. After obtaining the response results of the database interaction modules, the pseudo server module sends the response results to the arbiter for arbitration through the arbiter interaction module, and after obtaining an arbitration result, the pseudo server module responds to the user.

Preferably, the method further includes the dynamic data synchronization work, which specifically includes the following steps:

S41, maintaining, by the pseudo server module, a public key space, wherein the public key space stores a series of key-value pairs, keys in the key-value pairs are in one-to-one correspondence to keys in an actual Redis database, and values in the key-value pairs store a synchronization state;

S42, maintaining, by the pseudo server module, an iterator of a public key space, wherein the iterator is configured to traverse key-value pairs in the public key space; and S43, calling, by the pseudo server module, the iterator periodically to obtain key-value pairs in the public key space and determine whether to perform a synchronization action according to the synchronization state stored in the values in the key-value pairs;

S44, obtaining, by the pseudo server module, data values, corresponding to the keys needing to be synchronized, in the databases through a plurality of database interaction modules respectively, sending, by the pseudo server module, the corresponding data values in the databases to the arbiter for arbitration through the arbiter interaction module and obtaining an arbitration result, and updating, by the pseudo server module, the corresponding data values in the databases according to the arbitration result to complete the data synchronization.

Preferably, the judgment standard for determining whether to perform synchronization according to the synchronization state in S43 is to employ a random credit attenuation mechanism, and the random credit attenuation mechanism specifically includes the following steps:

S431, when a key-value pair is newly added to the public key space maintained by the pseudo server module, calling a random number generator to generate a random number, and storing the random number in the synchronization state corresponding to the keys;

S432, obtaining, by the pseudo server module, the key-value pair to be processed in the public key space through the iterator and attenuating the random number stored in the synchronization state according to a specific step size;

S433, synchronizing the keys to be processed if the value of the attenuated random number is less than a set threshold, regenerating a random number after synchronization is completed, and storing the random number in the synchronization state; and S434, calling, by the pseudo server module, the iterator to obtain the next key-value pair to be processed if the value of the attenuated random number is not less than the set threshold.

Further disclosed is an input/output proxy apparatus for a mimic Redis database, including a memory and one or more processors, wherein the memory stores executable codes, and the one or more processors, when executing the executable codes, are configured to implement the input/output proxy method for a mimic Redis database as described above.

Further disclosed is a computer-readable storage medium storing a program, wherein the program, when executed by a processor, implements the input/output proxy method for a mimic Redis database.

The present disclosure has the beneficial effects that:

Through the pseudo server module, it is ensured that the interface of the Redis database is consistent with the external interface of the native Redis, so that it is convenient to implant the Redis database into arbitrary Redis application scenarios; the isolation of the modules inside is realized by independent processes, thus facilitating independent development, maintenance and expansion; and the synchronization function is integrated into the input/output proxy to achieve resource reuse; for the synchronization function, the random credit attenuation mechanism is cleverly utilized to ensure the synchronization function while taking into account the saving of resources.

The features and advantages of the present disclosure will be described in detail through the embodiments in conjunction with the accompanying drawings.

BRIEF DESCRIPTION OF FIGURES

FIG. 1 is a flowchart of an input/output proxy method for a mimic Redis database according to an embodiment of the present disclosure.

DETAILED DESCRIPTION

In order to make the objectives, technical solutions and advantages of the present disclosure clearer, the present disclosure will be further described in detail below through the accompanying drawings and embodiments. However, it should be understood that the specific embodiments described herein are only used to explain the present disclosure, and not to limit the scope of the present disclosure. In addition, in the following description, descriptions of well-known structures and well-known art are omitted to avoid unnecessarily obscuring the concepts of the present disclosure.

Figure 2:
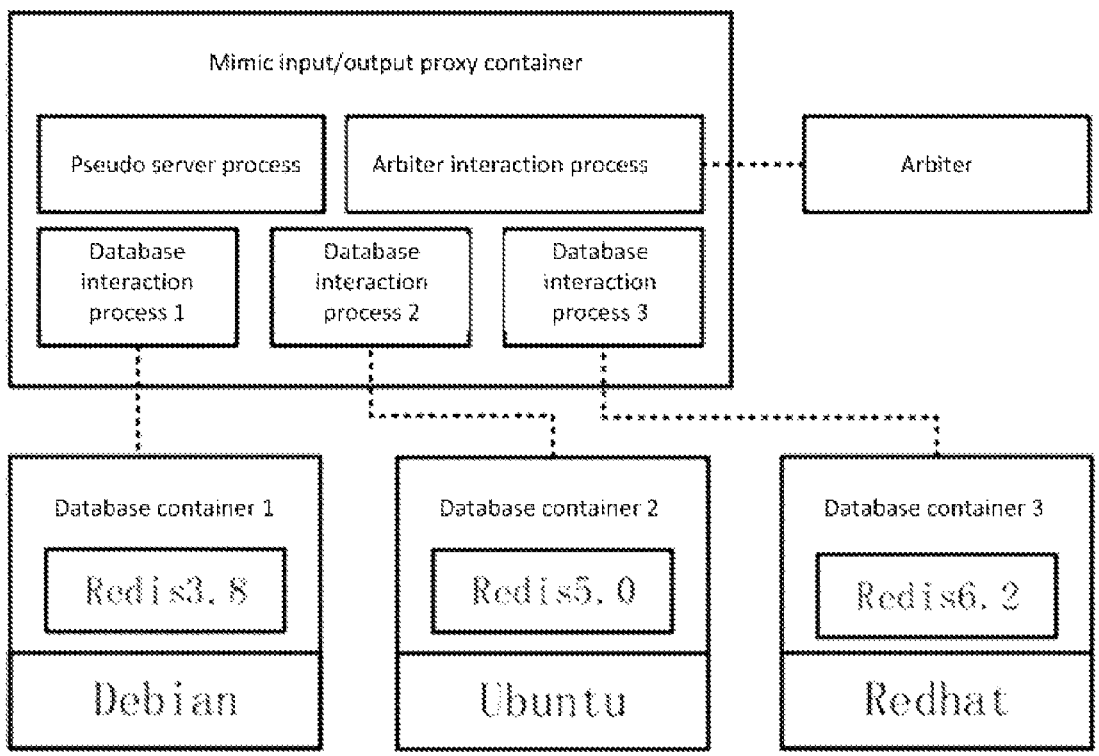
FIG. 2 is a schematic diagram of the interaction between a mimic input/output proxy container and an arbiter and heterogeneous database containers.

The present disclosure provides an input/output proxy method for a mimic Redis database, including a mimic Redis database, a mimic input/output proxy container and an arbiter, wherein the mimic Redis database includes at least three database containers running Redis server processes; the mimic input/output proxy container includes a pseudo server module, an arbiter interaction module and no less than three database interaction modules; the arbiter interaction module is connected with the arbiter; the database interaction module is connected with the database container; referring to FIG. 1, the method specifically includes the following steps:

S1, initialization phase: the pseudo server module, the arbiter interaction module and the database interaction modules run as independent processes, and data transmission channels for inter-process communication are established between the pseudo server module and the arbiter interaction module and the database interaction modules;

Specifically, referring to FIG. 2, in this embodiment, the input/output proxy process or container interfaces with three Redis database containers having heterogeneous base images (e.g., database container 1 is built based on the Debian base image, database container 2 is built based on the Ubuntu base image, database container 3 is built based on the Redhat base image), and the three containers each run one Redis server process, thus forming a mimic Redis database with dynamic heterogeneous redundancy features.

The mimic input/output proxy also runs in a container that runs five processes, and the processes are managed by Supervisord; the business programs of the pseudo server module, the arbiter interaction module and the database interaction modules are respectively executed in the processes.

The image of the container in which the input/output proxy runs in this embodiment is built based on Dockerfile, and the modules of the input/output proxy are coded with pure C and can be deployed on any server on which Linux software such as Docker and GCC is installed.

Each of the heterogeneous Redis databases shown in FIG. 2 only establishes an interaction connection with only one client—that is, the database interaction module in the input/output proxy container, and in this embodiment, the database interaction module acts as a separate process implementing its associated business logic as a Redis client via a hiRedis interface. Thus, the number of the database interaction modules in the input/output proxy process or container should be consistent with the number of dynamically heterogeneous Redis servers, and the consistency can be controlled by compiling macros.

At the same time, to establish a connection between the Redis client in the database interaction module and the heterogeneous Redis server shown in FIG. 2, the Redis client needs to obtain information, such as the port number and password, of the relevant server. In this embodiment, the server information is also configured into the input parameters of the hiRedis interface in the compilation phase by compiling the macros.

Figure 3:
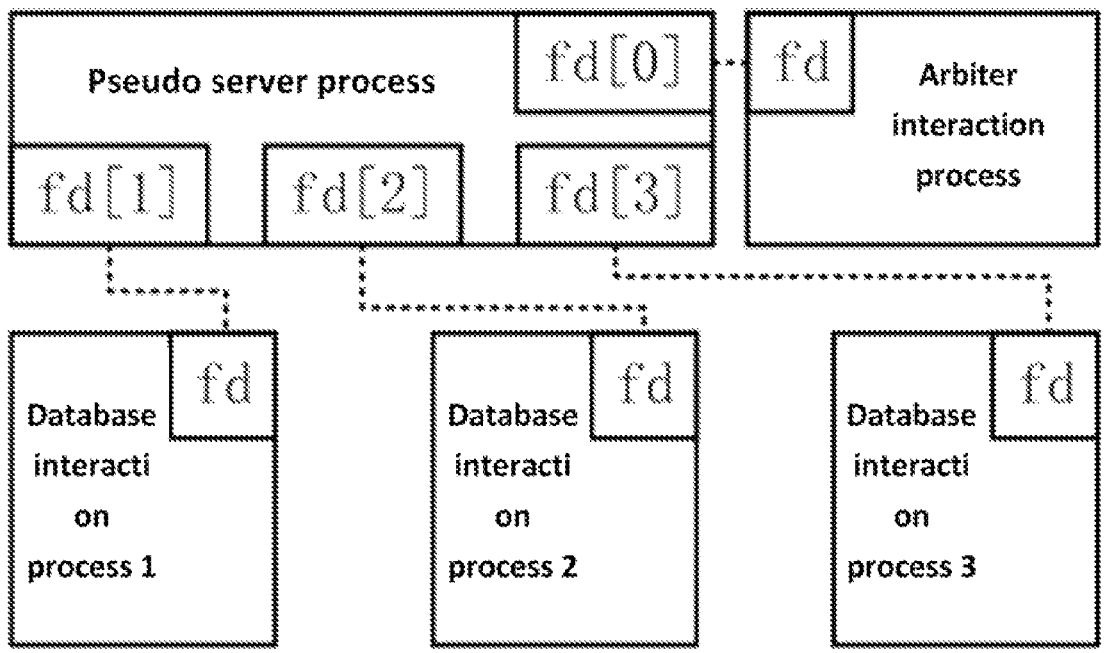
FIG. 3 is a schematic diagram of the interaction between a pseudo server process and an arbiter interaction process, and database interaction processes.

During the initialization phase of the processes of the mimic input/output proxy container, an inter-process communication (IPC) channel between the processes should be completed for subsequent data transmission. In this embodiment, Unix domain sockets are adopted to implement the data transmission channels of the inter-process communication. Specifically, referring to FIG. 3, one socket descriptor array fd[4] is maintained in the pseudo server process, and all four sockets are added to the pollfd structure array pfd[4] by 10 multiplexing technology for listening for messages of the four sockets in a non-blocking manner.

S2, the pseudo server module receives a connection establishment request initiated by a user, creates a socket bound to the user and establishes a connection while maintaining the state information of the user connection; wherein the state information includes, but is not limited to, input buffer length, input buffer address, output buffer length, output buffer address, and database ID currently operated by the user.

In this embodiment, the pseudo server module also establishes connections and interacts data with users via network inter-process communication technology, each connection corresponds to one socket descriptor, and the pseudo server module also adds these socket descriptors to the polling list of the 10 multiplexing technology for listening for requests initiated by respective users in a non-blocking manner.

Figure 4:
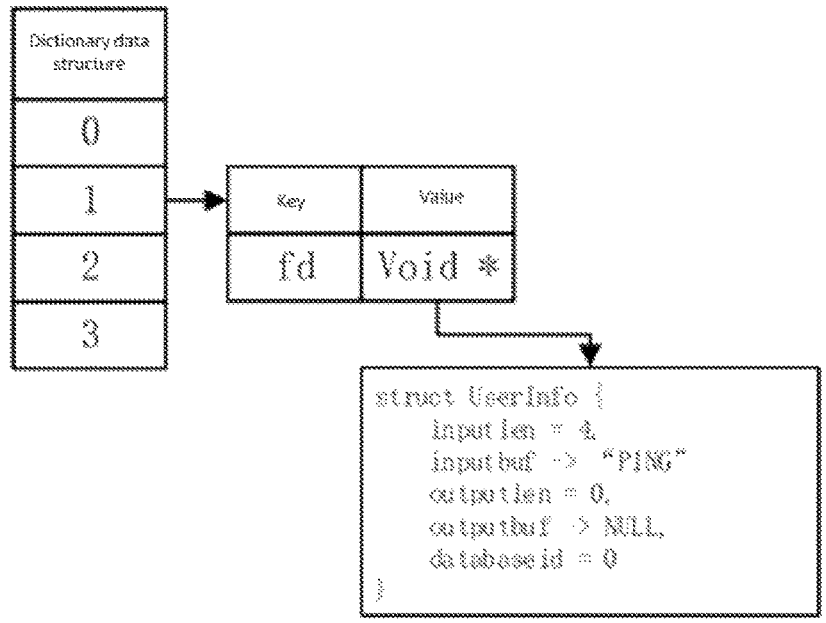
FIG. 4 is a schematic diagram of a dictionary data structure for storing state information of user connections.

In this embodiment, the pseudo server module manages the state information of each user connection through a dictionary data structure. Specifically, referring to FIG. 4, the key of the dictionary is the user connection socket descriptor, and the value of the dictionary is the state information structure pointer. In the above implementation, when an 10 multiplexing technology finds that a certain socket descriptor is readable, the corresponding state information can be quickly found from the dictionary data structure through the socket descriptor.

S3, the pseudo server module receives a command request initiated by the user, updates the state information of the user connection, obtains the type of the command request according to a definition mode of the type of the command request, and starts a response mode corresponding to the type of the command request; the pseudo server performs a corresponding operation according to the response mode;

in a feasible embodiment, the definition mode of the type of the command request includes pre-compilation definition and runtime definition; the pre-compilation definition specifically includes manually setting command types of various Redis interaction commands in the code development stage; the runtime definition includes adding a command option when a user sends a command request, and the pseudo server module determines the type of the command request according to the command option;

in the pseudo server module, all Redis database interaction commands are also stored in one dictionary data structure, the key of the dictionary is the command name, and the value of the dictionary is the response mode. When the pseudo server receives the Redis command sent by the user, and obtains the command name after parsing the Redis command, the corresponding response mode can be retrieved directly in the dictionary data structure.

Figure 5:
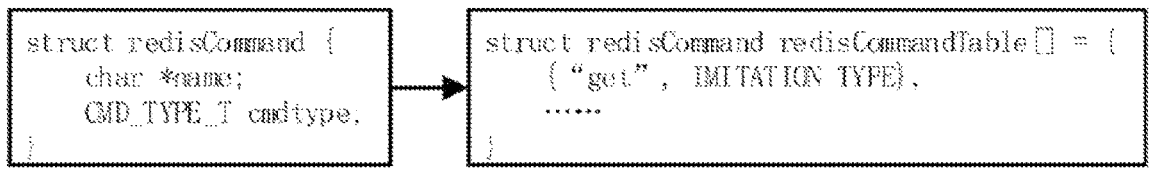
FIG. 5 is a schematic diagram of a structure array for defining Redis database interaction commands.

The dictionary storing the Redis database interaction commands is initialized by traversing a structure array that is then initialized directly during code defining. Specifically, referring to FIG. 5, the code developer can directly set the value of the cmdtype item during defining the RedisCommand array, so as to manually set the command type of various Redis interaction commands in the code development stage.

The code developer can set the type of the Redis database interaction command according to the actual application scenario, for example, the purpose of a simple "PING" command is only to get the "PONG" reply of the database server, so the "PING" command can be set to be executed in a normal mode; whereas the "SET" command is closely related to the data in the database, so the "SET" command is set to be executed in a mimic mode.

The type of the Redis command may also be set at runtime, in this embodiment, specifically, when the Redis command sent by the user is parsed, it is detected whether there is a "-imitationcmd" term, if so, it is indicated that the user customizes the command type of the command, and then response in the mimic mode or response in the normal mode is confirmed according to whether the value of the term is y or n; when the "-imitationcmd" term is default, then response is performed according to the type defined before compiling;

in a feasible embodiment, the response mode includes a normal mode and a mimic mode;

S31, in the normal mode, the pseudo server selects one of the database interaction modules based on the credit score mechanism, and enables the user to be indirectly connected with a database container running a Redis server process through the database interaction module;

the credit score mechanism has a variety of mature solutions, in this embodiment, a simple manner is adopted, that is, the database interaction module in the database interaction process 3 shown in FIG. 2 is manually set to have the highest credit score (because the database interaction process 3 interfaces with the Redis database of the lastest version), in the normal mode, the pseudo server module forwards the received user command request to the Redis database in the database container 3 directly through the database interaction process 3 for response, and returns the response result directly to the user;

the normal mode is mainly used in cases where fast response is required or the amount of data is large, such as "SYNC" and "PSYNC" commands.

S32, in the mimic mode, the pseudo server distributes the command request initiated by the user to no less than three database interaction modules at the same time, after obtaining the response results of the database interaction modules, the pseudo server module sends the response results to the arbiter for arbitration via the arbiter interaction module, and after obtaining an arbitration result, the pseudo server module responds to the user.

Figure 6:
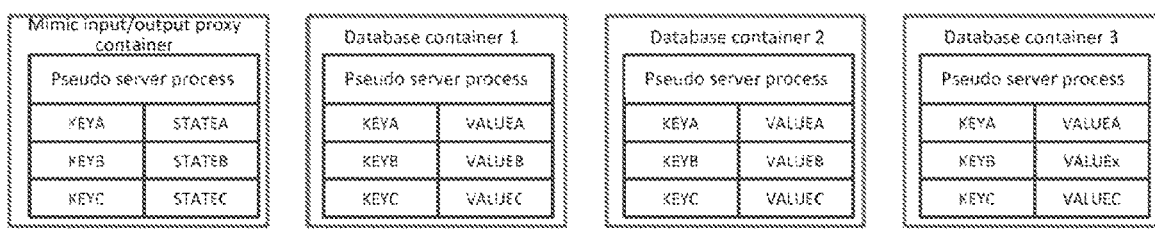
FIG. 6 is a schematic diagram of a public key space in a pseudo server process in a mimic input/output proxy process or container.

S4, the pseudo server module performs dynamic data synchronization, specifically including the steps:

S41, the pseudo server module maintains a public key space, wherein the public key space stores a series of key-value pairs, keys in the key-value pairs are in one-to-one correspondence to keys in the actual Redis database, and values in the key-value pairs store the synchronization state;

in this embodiment, specifically, referring to FIG. 6, the pseudo server process in the mimic input/output proxy container maintains a key-value space, wherein the key space is consistent with the database containers 1, 2 and 3. Since the key values in the database containers 1, 2 and 3 are all issued by the pseudo server process upon receiving the user's command, the pseudo server process can maintain a key space that is the same as all database containers.

S42, the pseudo server module maintains an iterator of a public key space, wherein the iterator is configured to traverse key-value pairs in the public key-value space;

the iterator may be implemented in a variety of ways, and in this embodiment, the functional requirements can be met by adopting an iterator of the dictionary data structure in the Redis native code.

S43, the pseudo server module periodically calls the iterator to obtain key-value pairs in the public key space and determines whether to perform a synchronization action according to the synchronization state stored in the values in the key-value pairs;

the judgment standard of determining whether to perform synchronization according to the synchronization state in S43 is to employ a random credit attenuation mechanism, and the random credit attenuation mechanism specifically includes the following steps:

S431, when a key-value pair is newly added to the public key space maintained by the pseudo server module, a random number generator is called to generate a random number, and the random number is stored in the synchronization state corresponding to the keys;

S432, the pseudo server module obtains the key-value pair to be processed in the public key space through the iterator and attenuates the random number stored in the synchronization state according to a specific step size;

S433, the keys to be processed are synchronized if the value of the attenuated random number is less than a set threshold, a random number is regenerated after synchronization is completed, and the random number is stored in the synchronization state;

S434, the pseudo server module calls the iterator to obtain the next key-value pair to be processed if the value of the attenuated random number is not less than the set threshold.

In this embodiment, the random number is an integer in the range interval of [0, 9], the set threshold is 2, and the value of each attenuation is 1. Assuming that the random values of KEYA, KEYB and KEYC in the initial state are 1, 3 and 5, respectively, and that the iterator of the dictionary performs cyclic iteration in the order of KEYA→KEYB→KEYC→KEYA . . . , then only KEYA satisfies the condition of being less than the threshold after the first cycle, synchronization of KEYA is started, and the random value is reacquired; KEYB and KEYC do not satisfy the condition of being less than the threshold, thus are decreased by one respectively and then enter the next cycle, and so on.

Since synchronization is a job that consumes resources and affects performance, the functional requirements and resource overhead of synchronization can be effectively balanced by the random attenuation mechanism described.

S44, the pseudo server module obtains data values, corresponding to the keys needing to be synchronized, in the databases through a plurality of database interaction modules respectively, the pseudo server module sends the corresponding data values in the databases to the arbiter for arbitration through the arbiter interaction module and obtains an arbitration result, and the pseudo server module updates the corresponding data values in the databases according to the arbitration result to complete the data synchronization.

After the keys needing to be synchronized are obtained through the above process, the pseudo server module obtains the values, corresponding to the keys, in the databases through the database interaction modules and then sends the values corresponding to the keys to the arbiter for arbitration through the arbiter interaction module, and if the arbiter returns a result that the data is valid and does not need to be updated, then iteration of the next key is performed. If the result returned by the arbiter is that the data needs to be updated, specifically, referring to FIG. 6, the value corresponding to KEYB in database container 3 is different from the value corresponding to KEYB in other databases, thus an accurate result is obtained after arbitration; the pseudo server module then updates the value corresponding to the KEYB key through the database interaction interface to complete the synchronization.

According to the above-mentioned input-output proxy method for a mimic Redis database, through the pseudo server module, it is ensured that the interface of the Redis database is consistent with the external interface of the native Redis, so that it is convenient to implant the Redis database into arbitrary Redis application scenarios; the isolation of the modules inside is realized by independent processes, thus facilitating independent development, maintenance and expansion; and the synchronization function is integrated into the input/output proxy to achieve resource reuse; for the synchronization function, the random credit attenuation mechanism is cleverly utilized to ensure the synchronization function while taking into account the saving of resources. In general, the input/output proxy method for a mimic Redis database is implemented.

Corresponding to the previously described embodiments of the input/output proxy method for a mimic Redis database, the present disclosure also provides embodiments of the input/output proxy apparatus for a mimic Redis database.

Figure 7:
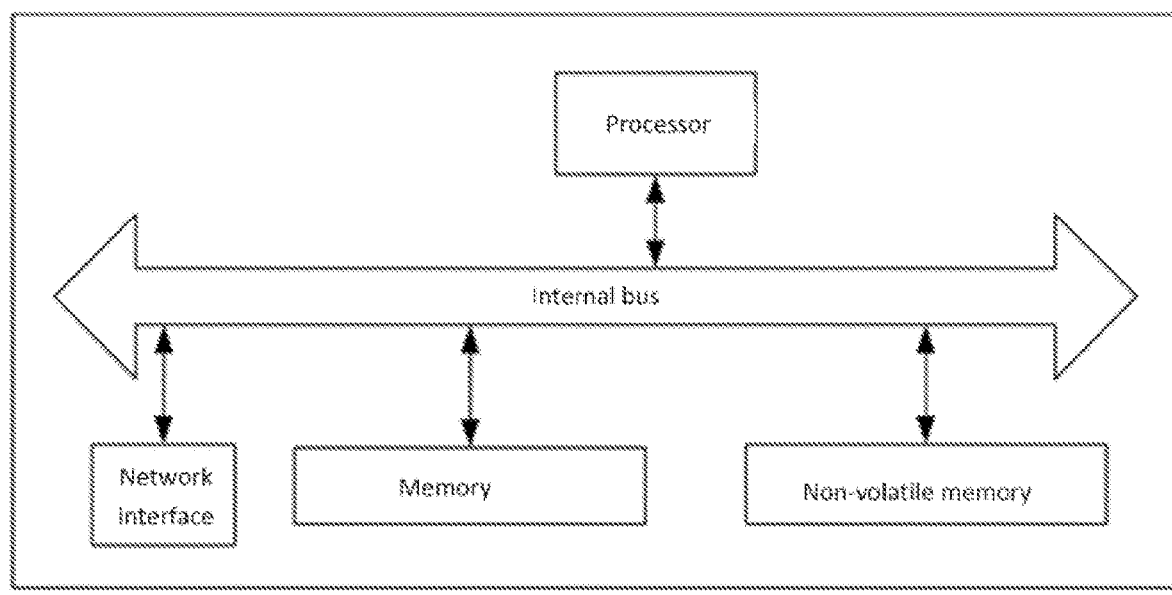
FIG. 7 is a structure diagram of an input/output proxy apparatus for a mimic Redis database of the present disclosure.

Referring to FIG. 7, an embodiment of the present disclosure provides an input/output proxy apparatus for a mimic Redis database, including a memory and one or more processors, wherein the memory stores executable codes, and the one or more processors, when executing the executable codes, implement the input/output proxy method for a mimic Redis database in the above embodiment.

Embodiments of the input/output proxy apparatus for a mimic Redis database of the present disclosure may be any device with data processing capability, which may be a device or apparatus such as a computer. Apparatus embodiments may be implemented through software, or through hardware or through a combination of hardware and software. Taking implementation through software as an example, an apparatus in a logical sense is formed by reading the corresponding computer program instructions in the non-volatile memory into the memory through the processor of any device with data processing capability where the apparatus is located. From the perspective of the hardware level, as shown in FIG. 7 which is a structure diagram of hardware of any device with data processing capability where the input/output proxy apparatus for a mimic Redis database according to the present disclosure is located, in addition to the processor, the memory, a network interface, and a non-volatile memory shown in FIG. 7, any device with data processing capability where the apparatus in the embodiments is located may also include other hardware, typically depending on the actual functionality of the any device with data processing capability, which will not be repeated.

For the implementation process of the functions and roles of the various units in the above-described apparatus, please refer to the implementation process of the corresponding steps in the above-described method, which will not be repeated here.

For the apparatus embodiments, since they basically correspond to the method embodiments, reference may be made to the partial descriptions of the method embodiments for related parts. The apparatus embodiments described above are only illustrative, wherein the units described as separate components may or may not be physically separated, and the components shown as units may or may not be physical units, that is, they may be located in one place, or may be distributed over multiple network elements. Some or all of the modules may be selected according to actual needs to achieve the purpose of the solution of the present disclosure. Those of ordinary skill in the art can understand and implement the embodiments without creative effort.

An embodiment of the present disclosure further provides a computer readable storage medium storing a program, wherein the program, when executed by a processor, implements the input/output proxy method for a mimic Redis database in the above embodiment.

The computer-readable storage medium may be an internal storage unit of any device with data processing capability described in any of the foregoing embodiments, such as a hard disk or a memory. The computer-readable storage medium may also be an external storage device of any device with data processing capability, such as a plug-in hard disk, a smart memory card (SMC), an SD card and a flash memory card equipped on the device. Further, the computer-readable storage medium may also include both an internal storage unit of any device with data processing capability and an external storage device. The computer-readable storage medium is used to store the computer program and other programs and data required by the device with data processing capability, and may also be used to temporarily store data that has been output or will be output.

The above description is merely preferred embodiments of the present disclosure, and is not intended to limit the present disclosure, and any modifications, equivalent replacements or improvements made within the spirit and principles of the present disclosure shall be included within the protection scope of the present disclosure.

What is claimed is:

1. An input/output proxy method for a mimic Redis database, comprising a mimic Redis database, a mimic input/output proxy container and an arbiter, wherein the mimic Redis database comprises at least three database containers running Redis server processes; the mimic input/output proxy container comprises a pseudo server module, an arbiter interaction module, and no less than three database interaction modules; the arbiter interaction module is connected with the arbiter; the database interaction module is connected with the database container; the method specifically comprises the following steps:

enabling the pseudo server module, the arbiter interaction module and the database interaction modules to run as independent processes, and establishing data transmission channels for inter-process communication between the pseudo server module and the arbiter interaction module and the database interaction modules;

receiving, by the pseudo server module, a connection establishment request initiated by a user, creating a socket bound to the user and establishing a connection while maintaining the state information of the user connection;

receiving, by the pseudo server module, a command request initiated by the user, updating the state information of the user connection, obtaining the type of the command request according to a definition mode of the type of the command request, and starting a response mode corresponding to the type of the command request; performing, by a pseudo server module, a corresponding operation according to the response mode; and performing, by the pseudo server module, dynamic data synchronization; specifically comprising the following steps:

maintaining, by the pseudo server module, a public key space, wherein the public key space stores a series of key-value pairs, keys in the key-value pairs are in one-to-one correspondence to keys in an actual Redis database, and values in the key-value pairs store a synchronization state;

maintaining, by the pseudo server module, an iterator of a public key space, wherein the iterator is configured to traverse key-value pairs in the public key space; and calling, by the pseudo server module, the iterator periodically to obtain key-value pairs in the public key space and determining whether to perform a synchronization action according to the synchronization state stored in the values in the key-value pairs; wherein the judgment standard of determining whether to perform synchronization according to the synchronization state is to employ a random credit attenuation mechanism, and the random credit attenuation mechanism specifically comprises the following steps:

when a key-value pair is newly added to the public key space maintained by the pseudo server module, calling a random number generator to generate a random number, and storing the random number in the synchronization state corresponding to the keys;

obtaining, by the pseudo server module, the key-value pair to be processed in the public key space through the iterator and attenuating the random number stored in the synchronization state according to a specific step size;

synchronizing the keys to be processed if the value of the attenuated random number is less than a set threshold, regenerating a random number after synchronization is completed, and storing the random number in the synchronization state; and calling, by the pseudo server module, the iterator to obtain the next key-value pair to be processed if the value of the attenuated random number is not less than the set threshold; and obtaining, by the pseudo server module, data values, corresponding to the keys needing to be synchronized, in the databases through a plurality of database interaction modules respectively, sending, by the pseudo server module, the corresponding data values in the databases to the arbiter for arbitration through the arbiter interaction module and obtaining an arbitration result, and updating, by the pseudo server module, the corresponding data values in the databases according to the arbitration result to complete the data synchronization.

2. The input/output proxy method for a mimic Redis database according to claim 1, wherein the number of the database containers is the same as the number of the database interaction modules.

3. The input/output proxy method for a mimic Redis database according to claim 1, wherein the state information in comprises socket descriptor, user name, user authentication information, user input buffer and user output buffer.

4. The input/output proxy method for a mimic Redis database according to claim 1, wherein the definition mode of the type of the command request in comprises pre-compilation definition and runtime definition;

the pre-compilation definition specifically comprises manually setting command types of various Redis interaction commands in the code development stage;

the runtime definition includes adding a command option when a user sends a command request, and the pseudo server module determines the type of the command request according to the command option.

5. The input/output proxy method for a mimic Redis database according to claim 1, wherein the response mode in comprises a normal mode and a mimic mode;

in the normal mode, the pseudo server selects one of the database interaction modules based on the credit score mechanism, and enables the user to be indirectly connected with a database container running a Redis server process through the database interaction module;

in the mimic mode, the pseudo server distributes the command request initiated by the user to no less than three database interaction modules at the same time, after obtaining the response results of the database interaction modules, the pseudo server module sends the response results to the arbiter for arbitration through the arbiter interaction module, and after obtaining an arbitration result, the pseudo server module responds to the user.

6. An input/output proxy apparatus for a mimic Redis database, comprising a memory and one or more processors, wherein the memory stores executable codes, and the one or more processors, when executing the executable codes, are configured to implement the input/output proxy method for a mimic Redis database according to claim 1.

7. A computer-readable storage medium storing a program, wherein the program, when executed by a processor, implements the input/output proxy method for a mimic Redis database according to claim 1.

\* \* \* \* \*